United States Patent [19]

Crosno

[11] 3,718,755

[45] Feb. 27, 1973

[54] INTERLACING SYSTEM FOR SKIP-FIELD MAGNETIC RECORDING AND REPRODUCING

[75] Inventor: Philip M. Crosno, Cupertino, Calif.

[73] Assignee: Cartridge Television, Inc., San Jose, Calif.

[22] Filed: June 26, 1970

[21] Appl. No.: 50,062

[52] U.S. Cl. ............................178/6.6 SF, 178/6.6 P

[51] Int. Cl.........H04n 5/06, H04n 5/78, G11b 19/28

[58] Field of Search.178/6.6 A, 6.6 P, 6.6 SF, 6.6 SP

[56] References Cited

UNITED STATES PATENTS

| | | | |
|---|---|---|---|
| 3,359,365 | 12/1967 | Kihara | 178/6.6 SF |
| 3,322,892 | 5/1967 | Yasuoka et al | 178/6.6 P |
| 3,391,248 | 7/1968 | Hirota | 178/6.6 SF |
| 3,470,315 | 9/1969 | Kihara | 178/6.6 |

*Primary Examiner*—Bernard Konick
*Assistant Examiner*—Steven B. Pokotilow
*Attorney*—Charles M. Hogan, Irwin P. Garfinkle and Townsend and Townsend

[57] ABSTRACT

A skip-field magnetic recording and reproducing system records each video field in one oblique track on a magnetic tape by means of rotary magnetic heads, only one of which records, while all of the heads play back to supply the skipped fields. Certain of the magnetic heads are axially and angularly misaligned so that playback of at least one of the heads is displaced by one-half a line in a conventional video field. Synchronization is achieved by substituting a position generated head switching signal for the vertical sync. This results in interlacing of the played back field.

4 Claims, 5 Drawing Figures

INVENTOR.
PHILIP M. CROSNO
BY Charles M. Hogan
Irwin P. Garfinkle
ATTORNEYS

INVENTOR.
PHILIP M. CROSNO
BY Charles M. Hogan
Irwin P. Garfinkle
ATTORNEYS.

INVENTOR.
PHILIP M. CROSNO
BY
ATTORNEYS.

INVENTOR.
PHILIP M. CROSNO
BY
ATTORNEYS,

INTERLACING SYSTEM FOR SKIP-FILED MAGNETIC RECORDING AND REPRODUCING

BACKGROUND OF THE INVENTION

This invention relates to a skip-field magnetic recording and reproducing system in which video picture signals are recorded on a magnetic tape by means of rotary magnetic heads scanning the tape obliquely to the direction of movement of the tape. The magnetic heads are physically positioned and the relative speed of the heads with respect to the tape is so related and arranged that during playback each of the heads scans the same oblique track. Such conventional systems are described in U.S. Pat. No. 3,359,365 issued to Kihara on Dec. 19, 1967. A system for synchronizing the rotation of the heads with the vertical sync is described in my copending application, now U.S. Pat. No. 3,662,099, titled "Servo System for Video Recorder" filed on the same day as this invention.

The present invention represents an improvement over the prior conventional skip-field systems and over my copending application in that I misalign certain of the magnetic heads so that playback of at least one of the heads is displaced by one-half a line. In addition, I use the head switching signal described in my copending patent application in lieu of the vertical sync. By doing this I "interlace" that field with the others. And, in addition, I am able to synchronize, since any error in synchronization which would have resulted from using the conventional vertical sync is eliminated by using the head switching pulse.

THE DRAWINGS

DESCRIPTION OF THE DISCLOSED EMBODIMENT

Figure 1:
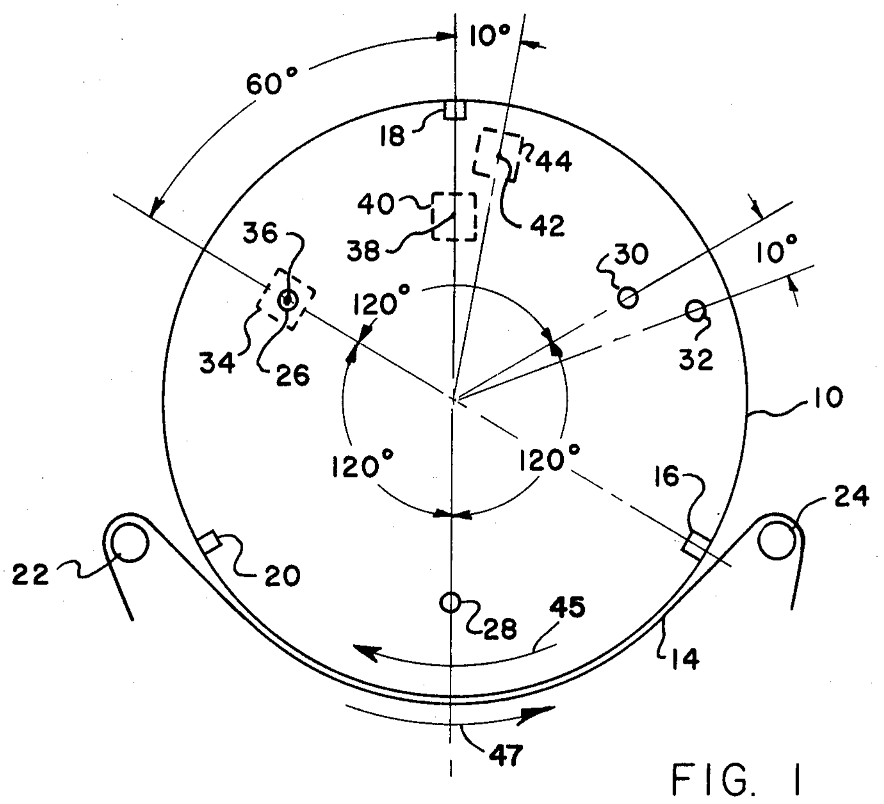
FIG. 1 is a schematic representation of the mechanical arrangement of the disk, magnetic heads and detecting devices used in accordance with this invention.
Figure 2:
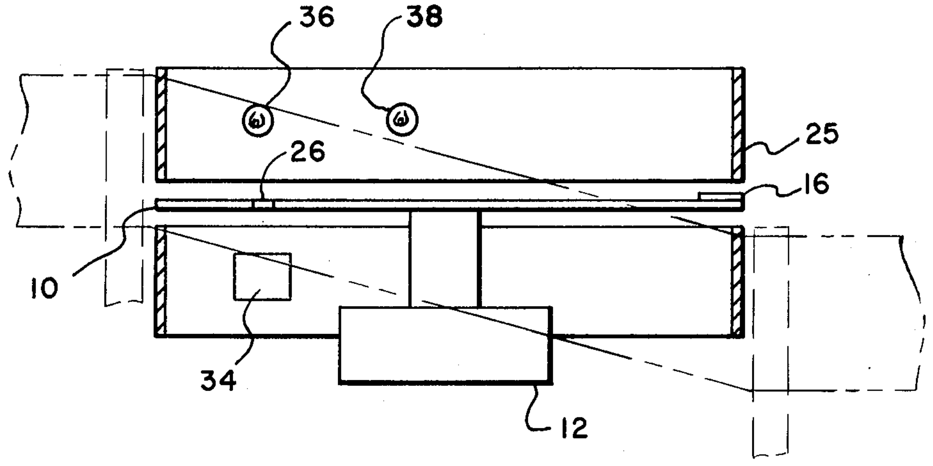
FIG. 2 is a cross-sectional view taken through the line 2—2.

Referring to FIGS. 1 and 2, the servo system includes a disk 10 driven by a motor 12. The system controls the speed and phase of the motor 12 with respect to the video signal, i.e., during record mode the disk is synchronized with the transmitted vertical sync signal, so that a control signal can be properly positioned on a tape 14 along with the video information, and during the playback the disk is synchronized with a recorded control signal.

As seen in FIG. 1, three angularly spaced magnetic recorder/reproducer heads 16, 18 and 20, are carried by the rotating disk 10. The magnetic tape 14 is maintained by means of tape guides 22 and 24 and by a "-clam shell" type stationary drum 25 in the arcuate path of the magnetic heads and helically disposed with respect to the disk 10 so that skewed magnetic tracks are applied to the tape in the manner taught in the Kihara patent. Moreover, the heads are axially spaced and the angular spacing of the heads is such that during playback each head scans the same recorded track, provided the speed of the head relative to the tape is properly established and maintained; however, the head 18 is intentionally misaligned so that it begins playback, not at the precise position of the head 16, but instead it begins playback at the same distance as required by Kihara plus or minus a distance equal to one-half of a horizontal line in the conventional video field. Thus, the system is arranged so that head 16 plays back 262.5 lines, head 18 plays back 262.5 lines and head 20 plays back 262.5 lines. This arrangement provides continuity of horizontal sync as in a conventional system, but causes an error in the vertical sync. However, this system utilizes a position responsive signal in lieu of vertical sync. That signal is derived as hereinafter described.

The disk 10 is opaque but is provided with three light-transmitting holes 26, 28, and 30 diagrammatically aligned with the heads 16, 18, and 20, respectively. In addition, the disk is provided with an additional light-transmitting hole 32 spaced approximately 10 ° from the hole 28 and positioned radially outward therefrom. Each of the holes 26, 28, and 30 are positioned equal distances from the axis of rotation of the disk.

Several light-sensitive pick-devices are fixedly positioned with respect to the rotation disk. A head switching pick-up device 34 is located at a position established by the point at which the head 16 enters the tape, i.e., the point on the tape at which it is desired that recording at head 16 begins. A second light-sensitive position pick-up device 40 is angularly spaced 60° from the switching pick-up device. Except when one of the holes 26, 28 and 30 is opposite the head switching pick-up device 34, the light from a stationary light source, diagrammatically shown as a stationary point 36, is blocked from it by the disk. Similarly, except when the holes 26, 28, and 30 are opposite a stationary light source 38, the light from the source 38 is blocked by the position pick-up device 40. The light sources 36 and 38 are positioned so that the light therefrom can be transmitted only to pick-up devices 34 and 40 through one of the 26, 28, and 30 when in a corresponding light-transmitting position.

A third stationary light source 42 is positioned opposite a "once around" pick-up device 44. The once-around pick-up device 44 is positioned with respect to the hole 32 so that light from the source 42 is transmitted therethrough only when the hole 32 is angularly aligned with the pick-up device 44. This occurs only once during each revolution of the disk.

While the pick-up devices have been described as light sensitive, and while the illustrated embodiment schematically provides stationary light sources in conjunction with a rotating disk having precisely positioned light-transmitting holes, it should be understood that this arrangement is described by way of example only and that other types of pick-up devices may be used. For example, the invention contemplates the use of magnetic pick-up devices to be used in conjunction with magnets. In some circumstances combinations of various pick-up devices may prove to be preferable.

As the disk 10 is rotated in the direction of the arrow 45 and head 16 enters the tape which is traveling in the direction of the arrow 47 to the position shown in FIG. 1, the head switching pick-up device 34 generates a head switching pulse 48 as a result of the light from the source 36 passing through the hole 26. Similarly, as the head 18 enters the tape, a second pulse 48 is developed and when the head 20 enters the tape, the pick-up device 34 generates a third pulse 48. Each time a pulse 48 is generated, one of the magnetic heads 16, 18, or 20 is switched into operation, by means of a logic circuit to be described below.

The position pulses 50 are always 60° displaced from the pulses 48. Similarly, the position pick-up device 40 is located 60° from the head switching pick-up device 34, and each time one of the holes 26, 28, or 30 passes this device, position pulse 50 is generated.

Figure 4:
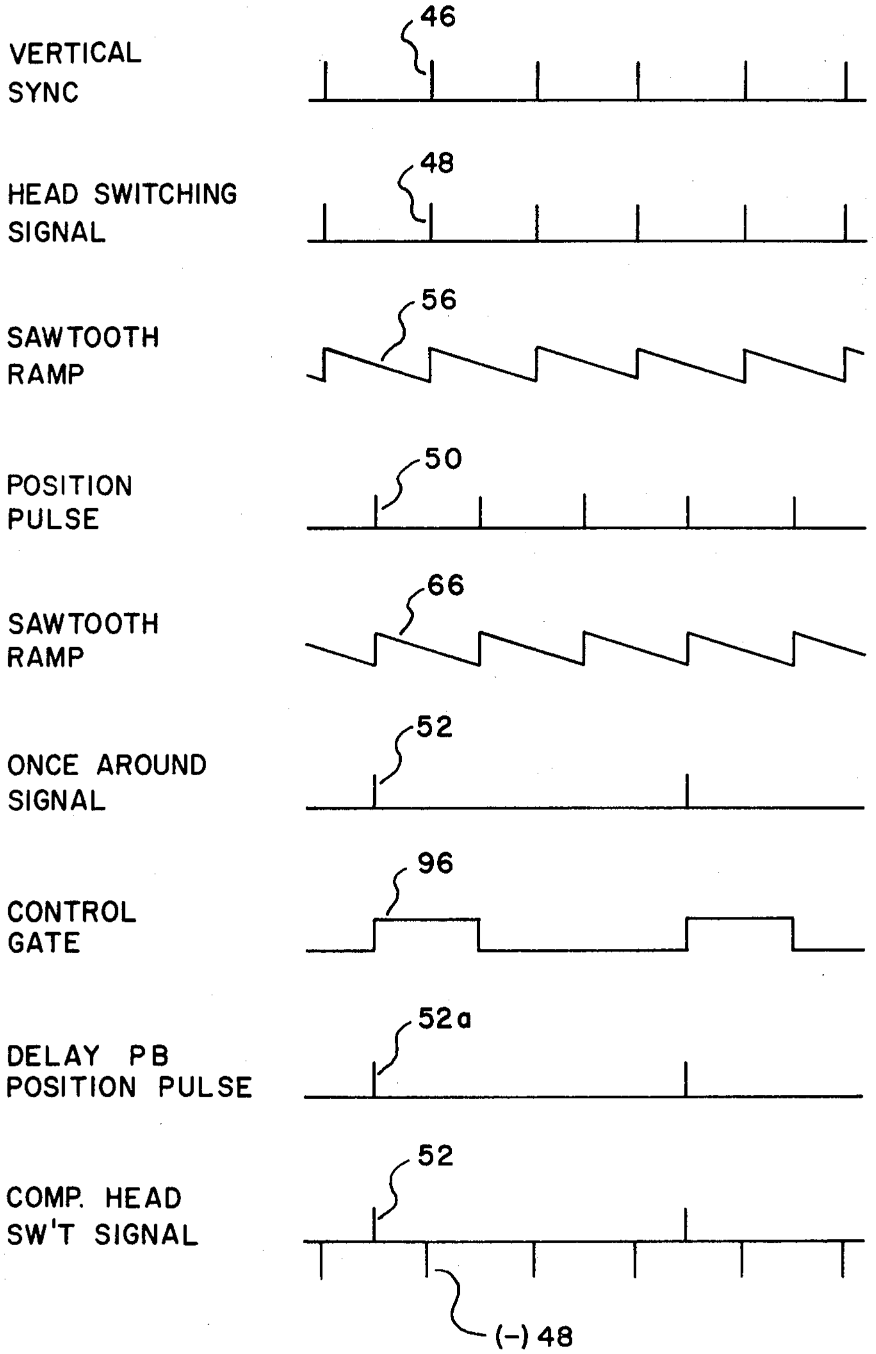
FIG. 4 shows a series of curves illustrating the operation of this invention.

Now refer to FIG. 4 wherein is illustrated a series of curves demonstrating the servo system. The vertical sync is shown as a series of pulses 46. These pulses are in the video transmission. The head-switching pulses 48 generated by the head switching pick-up device 34 are shown in synchronism with (or in some cases can be positioned slightly ahead of) the vertical sync signals 46. This, of course, is the desired end result and may not necessarily be the case when starting the system into operation.

In addition, each time the holes 32 passes the once-around pick-up device 44, a once-around signal pulse 52 is generated by the pick-up device 44. The pick-device 44 and the hole 32 are so related that there is a slight delay between it and the generation of the pulse generated as a result of the hole 28 passing the pick-up device 40. This is accomplished in the illustrated arrangement by spacing the hole 32 approximately 10° ahead of the hole 30, while the pick-up device 44 is spaced slightly more than 10° ahead of pick-up device 40.

Figure 3:
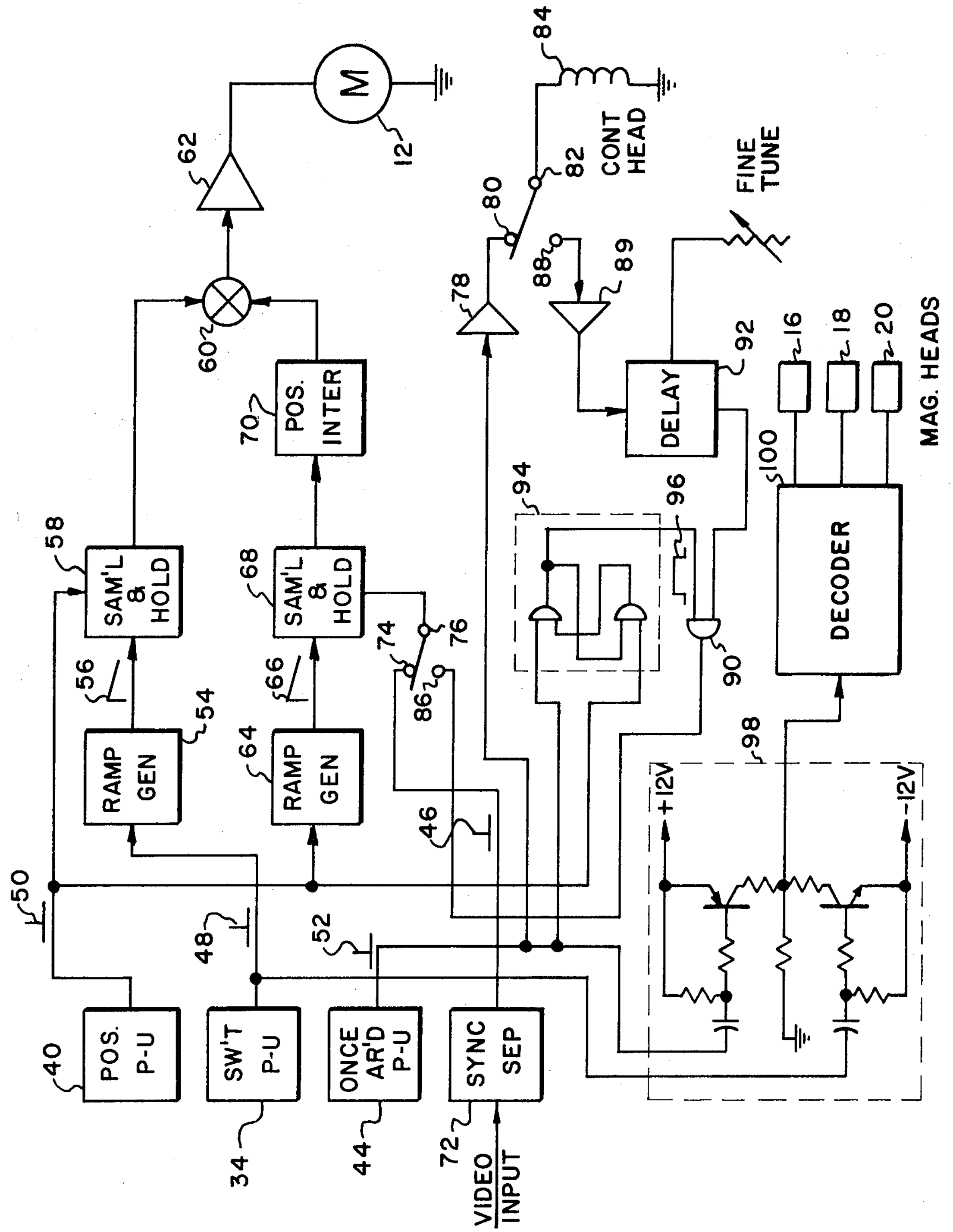
FIG. 3 is a schematic representation in block diagram form of the electronic circuitry utilized in accordance with this invention.

Refer now to FIG. 3. The servo system includes two similar servo loops, a velocity loop and a position loop. The switching pulses 48 from the pick-up device 34 are applied to a ramp generator 54 which serves to generate a sawtooth ramp 56. The sawtooth ramp 56 begins at some positive voltage and reduces to a negative voltage level at a rate dependent on pre-established time constants. These time constants are such that the sawtooth should be at ground potential when the hole 20 travels the 60° to the position pick-up device 40. When the position pick-up device 40 generates a pulse 50, the sawtooth 56 is sampled and held in a sample and hold circuit 58. Any voltage output from the sample and hold circuit 58 represents velocity error. This velocity error is applied to a summer 60 and then to an amplifier 62 in the control circuit of the motor 12.

Thus, the velocity loop consists of three measured time intervals for every revolution of the disk. This arrangement in conjunction with the placement of the pick-up devices results in velocity detection with no so-called "tooth to tooth" error. This result is achieved because the time it takes the disk to travel the same fixed distance, i.e., from pick-up device 34 to pick-up device 40, is measured for each hole. That is to say, one point on the disk (one of the holes 20, 28, or 30) causes the sawtooth ramp 56 to start and also results in a sample at a later time.

The output from the position pick-up device 40 is also applied to a second sawtooth ramp generator 64 in the position servo loop. Since the pick-devices 34 and 40 are spaced 60°, the sawtooth output 66 of the ramp generator 64 starts 60° later. The sawtooth ram 64 takes the same form as the sawtooth ramp 56 and is sampled and held in a sample and hold circuit 68. Any output from the sample and hold circuit 68 represents position error which is applied to an integrator 70, the output of which is applied to the summer 60 and then to the amplifier 62 in the control circuit of the motor 12.

In the record mode, the time of sampling of the sawtooth ramp 66 is determined by the occurrence of the vertical sync pulse 46 derived from a conventional sync separator 72. The pulse 46 is applied through the contact 74 of a record/playback switch 76 to the sample and hold circuit 68.

During record the once-around pulse 52 from the pick-up device 44 is applied through an amplifier 78 and the contact 80 of a record/playback switch 82 to a control magnetic recording head 84 which serves to record the pulse 52 on a track of the tape separate from the video tracks. In the playback mode the time of sampling of the sawtooth ramp 66 is established by a once-around signal **52*a* recorded on the tape. During playback the switches 76 and 82 are moved into playback position in contact with the contacts 86 and 88, respectively. Now the recorded once-around pulse 52*a* is picked up by the control head 84 and applied through the switch 82 to an amplifier 89 and to one input of an AND-gate 90 through a variable delay network 92. The output from the AND-gate 90 is applied to the sample and hold circuit 68 through the contact 86 of the switch 76. However, no output can occur from the AND gate until its second input is provided with a signal from a gate generator 94. The gate generator develops a gate pulse 96 only upon the simultaneous occurrence of a pulse 50 from the position pick-up device 40 and a once-around pulse 52 from the pick-up device 44. This assures that the heads are now playing back in the same sequence that the signals were recorded. The variable delay network 92 is provided so that the position of the delayed playback once-around pulse 52*a*** can be varied so as to accommodate differences in recording equipment.

The switching pulses 48 from the switching device 34 and the once-around pulses 52 from the pick-up device 44 are applied to an amplifier network 98 biased so that the composite output (curve 99) contains positive going pulses representing the once-around pulses 52 and negative going pulses representing the output pulses 48. This sequence of pulses when applied to a decoder 100 is used to switch the magnetic heads 16, 18, and 20 in the proper order.

Figure 5:
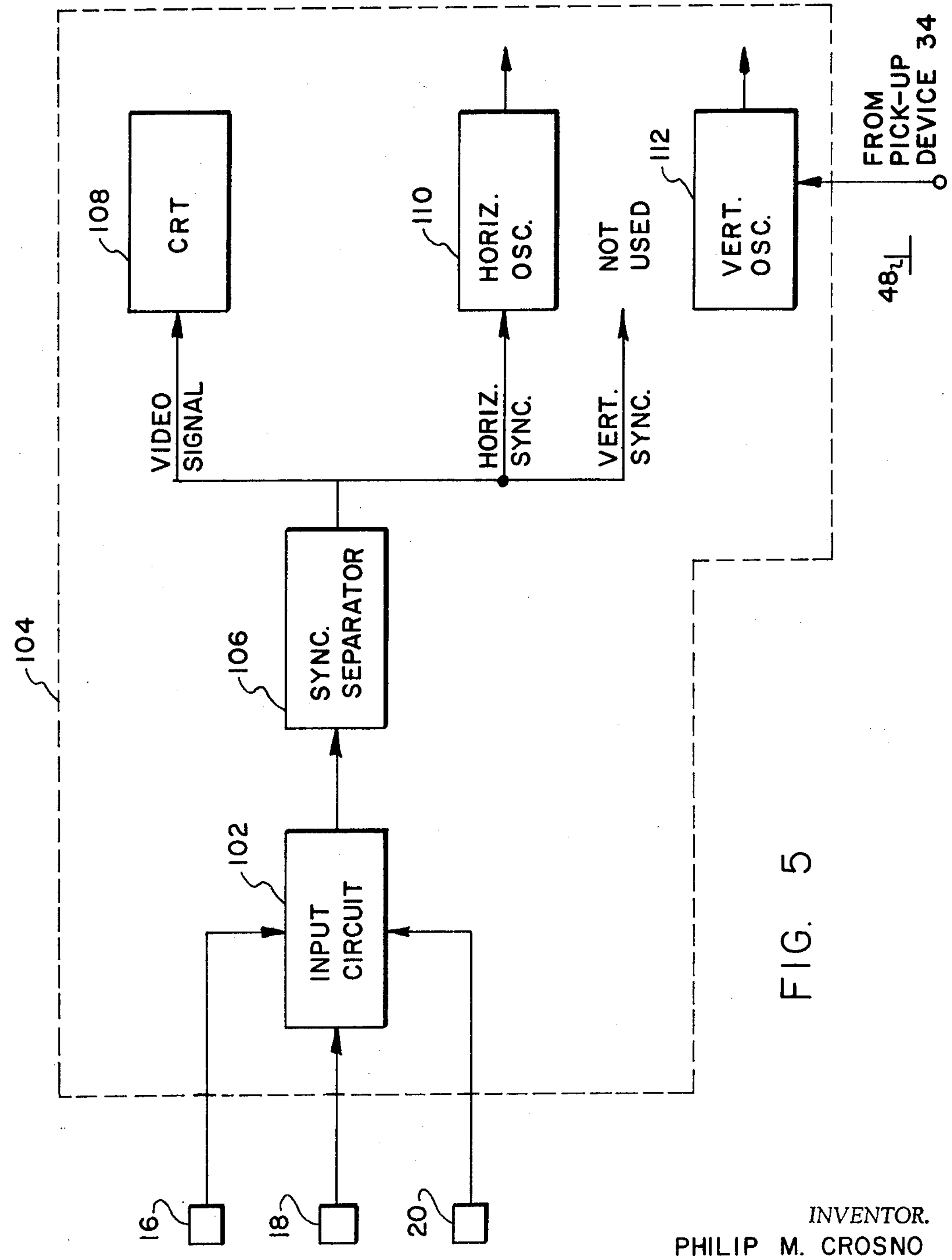
FIG. 5 illustrates in block diagram form the operation of the invention.

Refer now to FIG. 5. The outputs from the magnetic heads 16, 18, and 20 are combined in a conventional input circuit 102 of a picture reproducing circuit 104. The output from the circuit 102 is then applied to a conventional sync separator 106 which serves to separate the video signal, the horizontal sync signal and the vertical sync signal. The video signal is then applied to the cathode-ray tube 108. The horizontal sync signal is applied to the horizontal oscillator 110. The vertical sync signal is not used. Instead a simulated vertical sync signal for the vertical oscillator 112 is provided by the head switching signal 48 derived from the pick-up device 34. Thus, the vertical synchronization of the reproducer apparatus results from the positional information related to the position of the heads rater than from the conventional vertical sync. This factor permits synchronization in spite of the fact that the head 18 has been misaligned so that it begins reproduction one-half line early. This arrangement, therefore, produces an effective interlacing between the fields produced by the heads 16 and 20 with respect to the fields produced by the head 18. The fact that the system uses a simulated vertical sync derived from the head switching signal permits synchronization which could not be achieved from the vertical sync.

In a system of this invention as actually constructed, the following parameters were incorporated to provide the desired relation between the heads and the recorded information:

| | |
|---|---|
| Peripheral head speed | 543.61 inches per second |
| Tape speed | 3.8 inches per second |
| Spacing between head **16** and head **18** | 120.6138° |
| Spacing between head **18** and head **20** | 121.0741° |
| Spacing between head **20** and head **16** | 118.3121° |
| Axial displacement of head **18** with respect to head **16** | –.0028 inches |
| Axial displacement of head **20** with respect to head **18** | –.0056 inches |

It will be understood that the amount of information recorded on each oblique track is dependent on the amount of the tape wrap. In the foregoing embodiment the tape wrap was equal to 123.567°. With this degree of wrap and with the foregoing parameters, 268½ lines of video information are recorded on every track. By not using the vertical sync of the composite signal but instead substituting the position-responsive signal generated by the head switching pick-up, I was able to synchronize the head operation with head 18 operating one-half line early. It is important that the misalignment of the head be equal to exactly one-half so that there is a horizontal drive continuity.

I claim:

1. A skip-field video recorder/reproducer comprising:
means for recording composite video signals in oblique tracks on a moving magnetic tape, the signal in each track including a conventional video field, each field comprising video information arranged in a plurality of vertically displaced horizontal lines, a vertical sync signal and a horizontal sync signal, said means including a plurality of rotatable magnetic heads, said heads being angularly spaced and axially spaced so that certain of said heads are each normally aligned during playback with a field on an oblique track for tracing each entire field, and so that at least one of said heads is misaligned, said misaligned head tracing said track beginning at a point spaced one-half of a horizontal line from the beginning of said field;
drive means for rotating said heads, said drive means comprising a servo system for controlling the speed of rotation of said heads, said servo system including
first means when each of said heads is in a predetermined angular position for generating a first signal,
second means when each of said heads is in a second predetermined angular position for generating a second signal,
means for measuring the time period between the generation of each of said first signals and the generation of each of the succeeding of said second signals,
means responsive to a deviation from a predetermined time period between the generation of each of said first signals and the generation of the succeeding of said second signals for generating successive velocity error signals,
means responsive to said velocity error signals for controlling the speed of said drive means to reduce said error;
switching means for successively operating said heads;
means responsive to the generation of each of said first signals for actuating said switch means; and
means during playback for substituting said first signals for said vertical sync signal.

2. The invention as defined in claim 1 wherein said misaligned head is misaligned so as to play back the last half of the last line in a preceding field.

3. The invention as defined in claim 2 wherein said plurality of magnetic heads is equal to three.

4. The invention as defined in claim 3 wherein the second magnetic head is misaligned.

* * * * *